Inventors
GEORGES R. BOURREAU
JEAN-MARIE H. COLIN
By Philip M Belton
Attorney

United States Patent Office 3,416,066
Patented Dec. 10, 1968

3,416,066
CIRCUIT FOR GENERATING A FLOATING REFERENCE OUTPUT VOLTAGE
Georges Roger Bourreau, Paris, and Jean-Marie Henri Colin, Sceaux, Hauts-de-Seine, France, assignors to International Standard Electric Corporation, New York, N.Y., a corporation of Delaware
Filed May 5, 1966, Ser. No. 547,950
Claims priority, application France, May 24, 1965, 18,080
6 Claims. (Cl. 323—16)

ABSTRACT OF THE DISCLOSURE

A circuit provides a floating output voltage which is proportional to the input voltage. The circuit comprises an output resistor connected to four current generators, two on each side, one of them providing a constant current and the other providing a variable current which is proportional to the input voltage, the two variable current generators being controlled for phase opposition. When the input voltage is at a null no current flows in the output resistor, however, when the input voltage is not at null, a current flows in the output resistor which is proportional to the input voltage. The variation in phase opposition can be obtained by a differential amplifier which receives the input voltage and provides two output voltages controlling the two same current generators.

---

This invention relates to voltage generators and more particularly to a circuit having an input voltage applied to two input terminals, one of which is at a fixed potential (ground), to generate at its output terminal an output voltage with a floating reference potential, said output voltage having an amplitude proportional to the amplitude of the input voltage.

The term "floating reference potential" refers to an output voltage that is not influenced by the potential difference between one of the output terminals and a fixed potential (ground) within the limits of the operation of the circuit.

Normally, when a floating reference potential is required for a voltage the voltage is obtained from the secondary winding of an isolating transformer having the secondary winding isolated from the primary winding which receives an input voltage with reference to a fixed potential (ground). The disadvantage of an isolating transformer is that its pass band or frequency dependent characteristic will not permit a continuous or D.C. voltage to be transmitted therethrough.

An object of the present invention is to provide a circuit which supplies an output voltage with a floating reference potential proportional to the input signal applied to the input of the circuit wherein the frequency pass band is extended in the low part of the frequency spectrum down to zero frequency or D.C. voltage thereby eliminating the disadvantage of the normally employed isolating transformer.

A feature of this invention is the provision of a circuit for generating a floating reference output voltage proportional to an input voltage in the frequency range from zero to a given finite value comprising a resistor, first means coupled to one terminal of the resistor to produce a current flow through the resistor in a given direction, second means coupled to the other terminal of the resistor to produce a current flow through the resistor in a direction opposite the given direction, a source of input voltage, and third means coupled to the source and the first and second means responsive to the input voltage to control the current flow from the first and second means in phase opposition to provide across the resistor an output voltage having an amplitude proportional to the amplitude of the input voltage with a floating reference potential and a frequency equal to the frequency of the input voltage.

Figure 1:
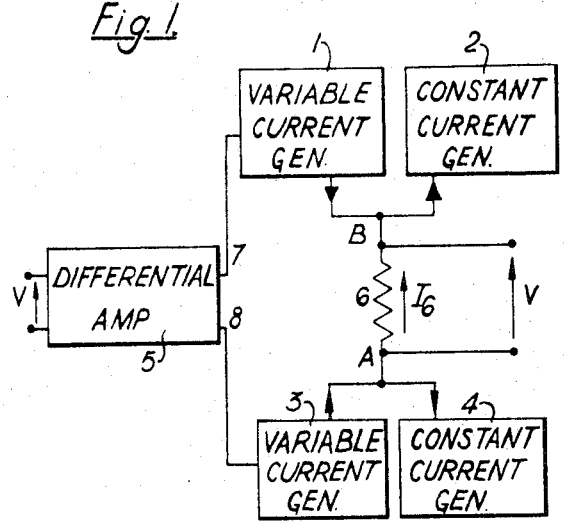
Figure 2:
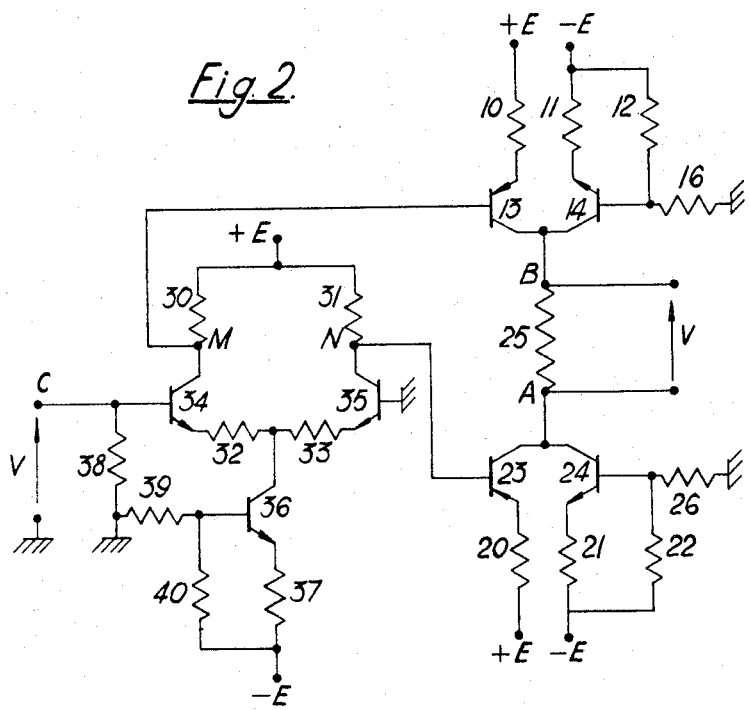

The above-mentioned and other features and objects of this invention will become more apparent by reference to the following description taken in conjunction with the accompanying drawings in which:

FIG. 1 is a block diagram of an embodiment in accordance with the principles of this invention; and FIG. 2 is a schematic diagram of one arrangement for implementing the embodiment of FIG. 1.

Referring to FIG. 1, current generators 1 and 2 are coupled to one terminal of resistor 6 and current generators 3 and 4 are coupled to the other terminal of resistor 6. Generators 1, 2, 3 and 4 supply currents having the directions indicated by the arrows. Generators 2 and 4 supply to resistor 6 equal currents of amplitude I but of opposite directions while generators 1 and 3 supply to resistor 6 currents also having opposite directions but with an amplitude which varies in phase opposition by a value $i$ on either side of the value I. The variation $i$ is proportional to the control or input voltage $v$ applied to the input of circuit 5 which as indicated hereinbelow may take the form of a differential amplifier.

When the input signal is absent, generators 1 and 2 supply equal currents having the directions in which the current supplied by generator 1 constitutes the current absorbed by generator 2. In addition the current supplied by generator 3 is equal to the current absorbed by generator 4.

Circuit 5 is a circuit that provides equal output voltages at outputs 7 and 8 when the input voltage $v$ is a null or zero and in addition will provide potentials at outputs 7 and 8 which varies in phase opposition by a value proportional to the input voltage $v$. Circuit 5 controls the value of the currents supplied by the generators 1 and 3 in such a way that when the current of one of these generators increases the current of the other generator decreases by the same value, and vice versa.

The operation of the circuit of FIG. 1 is as follows. When the input voltage $v$ of circuit 5 is zero, the output potentials at outputs 7 and 8 are equal and the generators 1 and 3 are designed to supply currents of the same amplitude I having the directions indicated by the arrows, these directions being such that equal currents but of opposite direction flow through resistor 6. Generators 2 and 4 are likewise designed to provide currents of constant amplitude I with the direction indication by the arrows. Thus, no current flows in resistor 6 and the potential difference V between points A and B is zero, that is, $V = V_A - V_B = 0$.

On the other hand, when the input voltage $v$ is different from zero, the potentials at the output terminals 7 and 8 vary in opposite directions with respect to each other by a value proportional to the voltage $v$ and the currents of generators 1 and 3 vary by a value $i$ proportional to $v$. Therefore, the current variation of generators 1 and 3 may be expressed as:

$$i = Kv \qquad (1)$$

Let us assume that the positive direction of current flow through resistor 6 is that direction of current $I_6$ illustrated in FIG. 1. When the input voltage $v$ is zero, the currents supplied by generators 1, 2, 3 and 4 will be, respectively, $-I$, $+I$, $+I$, $-I$. When the input voltage $v$ is, for instance, positive with respect to ground generators 1, 2, 3 and 4 will supply the currents $-I-i$, $+I$, $I-i$, $-I$, respectively.

The value of current $I_6$ which flows through resistor 6 may be determined by the algebraic addition of the currents produced by generators 1 and 2 which will be that amount of current flowing from point B to point A through resistor 6 and is expressed as:

$$I_6 = -I - i + I = -i \quad (2)$$

It is seen that this meets the requirements of Kirchhoff's second law at point A, that is, the algebraic sum of the currents flowing into and out of point A must be equal to zero. Since $-i$ is flowing into point A, the algebraic sum of the currents of generators 3 and 4 should provide a current $-i$ flowing into point A. This is seen to be true by the expression $I - i - I = i$.

The potential difference V between points A and B will have the following value, where R is the value of resistor 6:

$$V = V_A - V_B = -Ri \quad (3)$$

When the input voltage $v$ is negative with respect to ground, the currents delivered by generators 1, 2, 3 and 4, are, respectively: $-I+i$, $+I$, $+I+i$, $-I$. In a manner similar to that expressed hereinabove, the current flowing from point A to point B can be obtained by the algebraic addition of the currents supplied by generators 3 and 4 and the following expression results:

$$I_6 = +I + i - I = i \quad (4)$$

Under these conditions the voltage between points A and B is given by the expression:

$$V = V_A - V_B = Ri \quad (5)$$

Equations 3 and 5 may be expressed in terms of the input voltage $v$ by substituting Equation 1 in Equations 3 and 5 to give the following expressions:

$$V = V_A - V_B = -KRv \quad (6)$$

$$V = V_A - V_B = KRv \quad (7)$$

Generators 1 and 3 may be designed in such a way that the variation $i$ of their current should range between valves $-I$ and $+I$ which corresponds to the value of V varying between RI and $-RI$.

Since resistor 6 is connected to current generators, the internal impedance of which is infinite for a perfect generator, or at least very high with respect to resistor 6, the potentials of points A and B cannot be altered by a voltage which might be applied to point A or point B, the value of this voltage being within the limits permissible by the current generators. The voltage V is, therefore, not referred to any potential at all, and in particular, does not depend upon the reference voltage that might be applied thereto by the circuit to which voltage V is coupled.

FIG. 2 is one arrangement for implementing the embodiment of FIG. 1. Circuit 5, FIG. 1 has been realized by a differential amplifier constituted by the identical NPN transistors 34 and 35 whose emitter resistors 32 and 33 are connected to the collector of an NPN transistor 36 which operates as a constant current generator since its base is at a fixed potential produced by the bridge of resistors 40 and 39 connected between the supply voltage $-E$ and ground. The emitter resistor 37 of transistor 36 is coupled between the emitter thereof and the supply voltage $-E$.

The control or input voltage $v$ is appiled to the terminals of resistor 38 having one terminal connected to ground and the other terminal connected to the base of transistor 34. The base of transistor 35 is connected to ground potential.

When the input voltage $v$ is zero, the base of transistors 34 and 35 are at ground potential and transistors 34 and 35 are conductive. If transistors 34 and 35 have identical characteristics, and if resistors 30 and 32 are, respectively, equal to resistors 31 and 33, the potentials of the collectors at points M and N are equal to the value expressed as: $V_M = V_N = E - v_0$, $v_0$ designating the voltage drop in resistors 30 and 31. It should be noted that slight differences in the characteristics of transistors 34 and 35 may be compensated in a classical way by replacing resistors 32 and 33 by potentiometers. The identical PNP transistors 13 and 23 have their bases coupled to points M and N and thus have applied thereto the potential $E - v_0$. The emitters of transistors 13 and 23 are connected to the supply voltage E through equal resistors 10 and 20. Under these conditions, transistors 13 and 23 are conducted having a valve of emitter current equal to $$\frac{v_0 - VBE}{r}$$

where $r$ is the valve of the equal resistors 10 and 20 and VBE is the voltage drop in the emitter-base junction of the transistor 13 or 23.

Generators 2 and 4, FIG. 1, have been realized by the NPN transistors 14 and 24, the emitter resistors 11 and 21 having the same value $r$. Resistors 12 and 16 associated with transistor 14 and resistors 22 and 26 associated with transistor 24 have values chosen so that the potential of the base of each of these transistors is equal to $-E + v_0$ with respect to ground. The emitter current of each of transistors 14 and 24 is given by the expression $$\frac{v_0 - VBE}{r}$$

The various currents supplied by transistors 13, 14, 23 and 24 are then equal except for the sign and no current flows through resistor 25 and the resultant output voltage V taken between points A and B is equal to zero.

When voltage $v$ is different from zero, and is for instance, positive with respect to ground, the current which flows through transistor 34 increases and the potential of point M decreases by a value proportional to the voltage $v$, namely, $K_1 v$. On the other hand, the current through transistor 35 decreases and potential of point N increases by a value $K_1 v$. Thus, the sum of the currents supplied by transistors 34 and 35 remain fixed due to the presence of the constant current generator including transistor 36 resulting in the fact that when one of the transistors increases its current, the other transistor decreases its current, and vice versa.

The currents at the collector of transistors 13 and 23 controlled by the potentials of the points M and N also varies by a value $$i = \frac{K_1 v}{r}$$

Thus, the current of transistor 13 increases while the current of transistor 23 decreases.

A current of value $i$ then flows through resistor 25 in the direction of B towards A and the output voltage $$V = V_A - V_B = -Ri = -K_1 \frac{R}{r} v$$

where $K_1$ is the voltage gain of the differential amplifier.

Employing similar reasoning when the voltage $v$ is negative with respect to ground, the current of transistor 13 decreases while the current of transistor 23 increases and the output voltage V is then produced with a direction opposite to the direction outlined hereinabove when voltage $v$ is positive with respect to ground.

It will be noted that in order to minimize in transistors 13 and 23 and transistors 14 and 24 the current variations due to thermal variations these transistors are chosen in such a way that they have characteristics and in particular thermal characteristics as close as possible. Furthermore, each group of two transistors 13 and 23, 14 and 24 may be located in the same box in order that the transistors of a group will be submitted to the same thermal conditions.

The differential amplifier may be designed so that the potentials at points M and N will have a maximum variation $v_0$ on both sides of the rest voltage $E - v_0$ so that the currents of transistors 13 and 23 may vary by a value $v_0/r$ equal to the value I of the rest currents on both sides of the value I. Thus, the output voltage V will vary between the values $-RI$ and RI. However, the ultimate values of the potentials at points M and N must not block or saturate either of the transistors 13 and 23.

The present description has been presented with generators 1 and 3, FIG. 1 operating as variable current generators while generators 2 and 4 supply a fixed current. However, it is obvious that generators 2 and 4 may be variable current generators with generators 1 and 3 suppling a fixed current. In this case, the control differential amplifier of circuit 5 must be designed accordingly.

Generators 1 and 4 may also be used as variable current generators while generators 2 and 3 supply a fixed current, and vice versa. The control circuit 5, of course, must be adapted to each new arrangement of the generators. According to another embodiment each one of the four generators may supply a variable current with the generators being grouped two by two, with two of the generators being connected to one terminal of resistor 6 and the other two generators being connected to the other terminal of resistor 6. Each group will then be controlled by a circuit the output voltages of which are arranged to provide a voltage $V=0$ when the input voltage $v$ is zero.

Since the current generators do not include condensers or inductors, the input voltage $v$ may be a continuous or D.C. voltage in which case the output voltage V is also a continuous or D.C. voltage. The input voltage $v$ may also be an alternating current voltage having a finite frequency and in this case the output voltage V will vary at the rate of the frequency of the input signal. The limit of permissible frequencies above zero is determined by the characteristics of the transistors employed.

While we have described above the principles of our invention in connection with specific apparatus, it is to be clearly understood that this description is made only by way of example and not as a limitation to the scope of our invention as set forth in the objects thereof and in the accompanying claims.

We claim:

1. A circuit for generating a floating output voltage proportional to an input voltage in the frequency range from zero to a given finite value comprising:

a resistor;

first means coupled to one terminal of said resistor to produce a current flow through said resistor in a given direction;

second means coupled to the other terminal of said resistor to produce a current flow through said resistor in a direction opposite said given direction;

a source of said input voltage;

third means coupled to said source and said first and second means responsive to said input voltage to control the current flow from said first and second means in phase opposition to provide across said resistor said output voltage having an amplitude proportional to the amplitude of said input voltage and a frequency equal to the frequency of said input voltage; and said first and second means each include a constant current generator and a variable current generator, and said third means includes a differential amplifier.

2. A circuit according to claim 1, wherein said constant current generator of said first means causing a constant current to flow in a predetermined direction, and said constant current generator of said second means causing another constant current to flow in a direction opposite said predetermined direction.

3. A circuit according to claim 2, wherein said variable current generator of said first means causing a variable current output therefrom to flow in a selected direction, and said variable current generator of said second means causing another variable current output therefrom to flow in a direction opposite said selected direction.

4. A circuit according to claim 3, wherein said selected direction and said direction opposite said selected direction equals, respectively, said given direction and said direction opposite said given direction, and said predetermined direction and said direction opposite said predetermined direction equals, respectively, said direction opposite said given direction and said given direction.

5. A circuit according to claim 1, wherein said differential amplifier has its input coupled to said source, with one of its outputs coupled to said variable current generator of said first means, and with the other of its outputs coupled to said variable current generator of said second means to control said variable current generators in phase opposition.

6. A circuit according to claim 3, wherein each of said variable current generators produce a quiescent value of variable current equal to the value of said constant current when said input signal is zero, and said differential amplifier controls the magnitude of the variable current produced by said variable current generators in phase opposition from said quiescent value.

References Cited

UNITED STATES PATENTS

| | | | |
|---|---|---|---|
| 2,682,638 | 6/1954 | Enabnit | 324—140 |
| 2,993,172 | 7/1961 | Karlicek | 307—57 X |
| 3,003,108 | 10/1961 | Thiele | 324—140 |
| 3,175,103 | 3/1965 | Kline | 323—22 X |

LEE T. HIX, *Primary Examiner.*

A. D. PELLINEN, *Assistant Examiner.*

U.S. Cl. X.R.

323—25; 307—54, 57